United States Patent
Yoshitomo et al.

(10) Patent No.: US 9,929,545 B2
(45) Date of Patent: Mar. 27, 2018

(54) INSULATING SUPPORT FOR POWER SWITCHGEAR

(71) Applicant: MITSUBISHI ELECTRIC CORPORATION, Chiyoda-ku, Tokyo (JP)

(72) Inventors: Yuji Yoshitomo, Tokyo (JP); Hirokazu Otani, Tokyo (JP); Daisuke Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/916,020

(22) PCT Filed: Sep. 6, 2013

(86) PCT No.: PCT/JP2013/074066
§ 371 (c)(1),
(2) Date: Mar. 2, 2016

(87) PCT Pub. No.: WO2015/033434
PCT Pub. Date: Mar. 12, 2015

(65) Prior Publication Data
US 2016/0197458 A1    Jul. 7, 2016

(51) Int. Cl.
*F16M 11/00* (2006.01)
*H02B 1/01* (2006.01)
(Continued)

(52) U.S. Cl.
CPC .............. *H02B 1/01* (2013.01); *F16M 11/00* (2013.01); *H01B 17/16* (2013.01); *H01B 17/32* (2013.01)

(58) Field of Classification Search
USPC ....................................................... 248/176.1
See application file for complete search history.

(56) References Cited

U.S. PATENT DOCUMENTS

| | | | | |
|---|---|---|---|---|
| 3,229,055 A | * | 1/1966 | Alexander | ............. H01B 17/14 174/150 |
| 3,832,482 A | * | 8/1974 | Tragesser | ............... H01B 17/44 174/141 R |

(Continued)

FOREIGN PATENT DOCUMENTS

| | | |
|---|---|---|
| JP | 27-10650 Y2 | 12/1952 |
| JP | 52-161298 U | 12/1977 |

(Continued)

OTHER PUBLICATIONS

International Search Report (PCT/ISA/210) dated Oct. 29, 2013, by the Japanese Patent Office as the International Searching Authority for International Application No. PCT/JP2013/074066.

(Continued)

*Primary Examiner* — Monica E Millner
(74) *Attorney, Agent, or Firm* — Buchanan Ingersoll & Rooney PC

(57) ABSTRACT

The present invention relates to an insulating support for a power switchgear that insulates and supports the main body of a power switchgear provided in atmospheric air between a generator and a main transformer. The insulating support includes a core part that is molded only from a resin material and has a cylindrical shape; an exterior covering part that is molded only from a rubber material, is attached to an outer peripheral face of the core part, and includes a plurality of pleated parts; an end metal fitting that is attached to one end of the core part and is attached to the main body of the power switchgear; and an end metal fitting that is attached to the other end of the core part and is provided on the ground surface.

13 Claims, 5 Drawing Sheets

(51) Int. Cl.
*H01B 17/16* (2006.01)
*H01B 17/32* (2006.01)

(56) References Cited

U.S. PATENT DOCUMENTS

| | | | | |
|---|---|---|---|---|
| 4,312,123 | A | | 1/1982 | Wheeler |
| 4,372,907 | A | * | 2/1983 | Herold .................. B29C 33/005 |
| | | | | 264/265 |
| 4,373,113 | A | * | 2/1983 | Winkler ............ B29C 45/14549 |
| | | | | 174/179 |
| 4,505,033 | A | | 3/1985 | Wheeler |
| 4,524,404 | A | * | 6/1985 | Verma .................... H01B 17/42 |
| | | | | 174/140 R |
| 4,620,959 | A | * | 11/1986 | Goto ........................ B29C 33/46 |
| | | | | 249/63 |
| 5,281,767 | A | * | 1/1994 | West ...................... H01B 17/26 |
| | | | | 174/142 |
| 5,612,069 | A | | 3/1997 | Goto |
| 5,633,478 | A | * | 5/1997 | Ishino .................... H01B 17/12 |
| | | | | 174/179 |
| 5,877,453 | A | * | 3/1999 | Hill ...................... H01B 17/325 |
| | | | | 174/179 |
| 5,915,761 | A | * | 6/1999 | Moriya .................. H01B 17/32 |
| | | | | 174/209 |
| 5,986,216 | A | * | 11/1999 | Krause .................. H01B 17/18 |
| | | | | 174/179 |
| 6,342,679 | B1 | * | 1/2002 | Portas .................. B29C 69/001 |
| | | | | 174/178 |
| 6,811,732 | B2 | * | 11/2004 | Marumasu ........... H01B 17/325 |
| | | | | 264/145 |
| 6,897,384 | B2 | * | 5/2005 | Fujii ...................... H01B 17/18 |
| | | | | 174/140 S |
| 7,251,881 | B2 | * | 8/2007 | Nguyen ............... H02G 15/068 |
| | | | | 174/73.1 |
| 7,342,176 | B2 | * | 3/2008 | Takeda ................. H01B 17/325 |
| | | | | 174/138 F |
| 2004/0135133 | A1 | | 7/2004 | Fujii |
| 2005/0155786 | A1 | * | 7/2005 | Krol ....................... H01B 17/28 |
| | | | | 174/137 A |

FOREIGN PATENT DOCUMENTS

| | | |
|---|---|---|
| JP | 61-181015 A | 8/1986 |
| JP | 06-162854 A | 6/1994 |
| JP | 06-203680 A | 7/1994 |
| JP | 07-308016 A | 11/1995 |
| JP | 09-161576 A | 6/1997 |
| JP | 09-288921 A | 11/1997 |
| JP | 09-320368 A | 12/1997 |
| JP | 2001-067960 A | 3/2001 |
| JP | 2003-052107 A | 2/2003 |
| JP | 2004-213984 A | 7/2004 |

OTHER PUBLICATIONS

Office Action (Notice of Rejection) dated Apr. 30, 2014, by the Japanese Patent Office in corresponding Japanese Patent Application No. 2014-500195, and an English Translation of the Office Action. (6 pages).

* cited by examiner

INSULATING SUPPORT FOR POWER SWITCHGEAR

FIELD

The present invention relates to an insulating support that is applied to a power switchgear provided between a generator and a main transformer.

BACKGROUND

In a power switchgear (a main circuit switchgear) provided between a generator and a main transformer in a power station or the like, the conduction part, which is the main body of the power switchgear, is insulated and supported by insulating supports in atmospheric air (see, for example, Patent Literature 1).

Because the insulating supports need to support the conduction part, which is heavy, the insulating supports are formed from an epoxy-based molded insulating material, which generally has mechanical strength. Because the effect of soiling is taken into account, each of the insulating supports is provided with pleated parts to ensure there is a certain creepage distance. These pleated parts are molded from epoxy resin and to be one with the core part.

Patent Literature 2 describes an insulator molding method and a molding apparatus in which a long core made of FRP (Fiber Reinforced Plastics) or epoxy resin is sequentially moved to continuously mold a rubber exterior covering, which has a shading part, around the long core. With the method and apparatus mentioned above, it is regarded that an insulator can be easily and accurately molded by using a short mold.

CITATION LIST

Patent Literatures

Patent Literature 1: Japanese Patent Application Laid-open No. 2003-52107
Patent Literature 2: Japanese Patent Application Laid-open No. H6-203680

SUMMARY

Technical Problem

The known insulating supports for power switchgear are molded as one part with a core part and a pleated part and from epoxy resin, and thus the structure of the mold is complicated, which in turn easily generates shrinkage, voids, burrs, or the like during molding. This means the pleated parts need to be processed after the molding. Therefore, a considerable amount of labor and money is required to make the insulating supports.

Further, insulating supports for power switchgears are required to have mechanical strength enough to bear the load of a conduction part. Therefore, the method of molding an insulator is difficult to use as it is.

The present invention has been achieved in view of the above problems, and an objective of the present invention is to provide an insulating support for a power switchgear that is easy to produce, is inexpensive, and has excellent mechanical strength and insulating properties.

Solution to Problem

In order to solve the problem and achieve the objective mentioned above, the present invention relates to an insulating support for a power switchgear that insulates and supports a main body of a power switchgear provided in atmospheric air between a generator and a main transformer. The insulating support includes: a solid core part that is molded only from a resin material and has a cylindrical shape or a truncated cone shape; an exterior covering part that is molded only from a rubber material, is attached to an outer peripheral face of the core part, and includes a plurality of pleated parts, the pleated parts being are provided so as to be apart from one another in an axis direction of the core part and each of the pleated parts being provided over an entire periphery of the core part; a first end metal fitting that includes a first buried part buried in one end of the core part and a first base end part provided outside the core part, connected to the first buried part, and attached to the main body; and a second end metal fitting that includes a second buried part buried in another end of the core part and a second base end part provided outside the core part, connected to the second buried part, and provided on a ground surface.

Advantageous Effects of Invention

According to the present invention, it is possible to provide an insulating support for a power switchgear that is produced easily and inexpensively and has excellent mechanical strength and insulating properties.

DESCRIPTION OF EMBODIMENTS

Exemplary embodiments of an insulating support for a power switchgear according to the present invention will be explained below in detail with reference to the accompanying drawings. Note that the present invention is not limited to these embodiments.

First Embodiment

Figure 1:
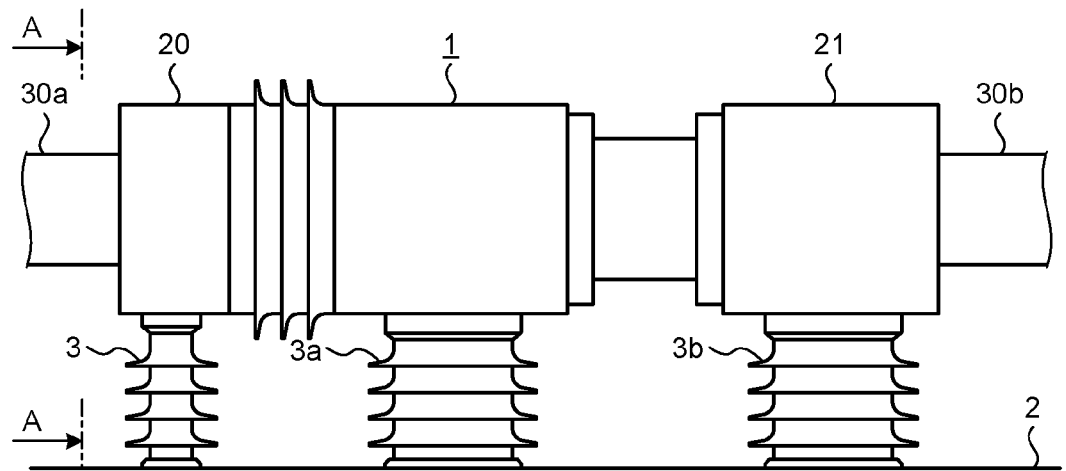
FIG. 1 is a side view illustrating a power switchgear according to a first embodiment.

FIG. 1 is a side view illustrating a power switchgear according to a first embodiment of the present invention.

Figure 2:
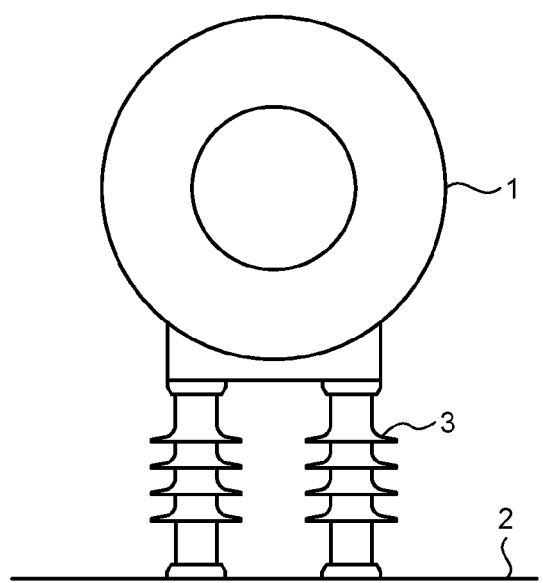
FIG. 2 is a sectional view in the direction of arrow A-A in FIG. 1.

FIG. 2 is a sectional view in the direction of arrow A-A in FIG. 1. A power switchgear 1 is provided between a generator (not illustrated) and a main transformer (not illustrated) in a power station or the like. The power switchgear 1 includes a breaker 20; a disconnector 21 connected to the breaker 20; and insulating supports 3, 3a, and 3b supporting the breaker 20 and the disconnector 21. The breaker 20 and the disconnector 21 constitute the main body of the power switchgear. The breaker 20 is configured to have a breaking part in a metal container. The disconnector 21 is configured to have a disconnecting part in a metal container. The breaker 20 is connected to a bus 30a. The disconnector 21 is connected to a bus 30b. The insulating supports 3, 3a, and 3b are provided on a ground surface 2 and support the main body of the power switchgear in midair. Note that the positions and the number of the insulating supports are not limited to those illustrated in the drawings. The power switchgear 1 and the buses 30a and 30b are provided in corresponding exterior coverings, but illustrations of the exterior coverings are omitted in FIGS. 1 and 2.

Figure 3:
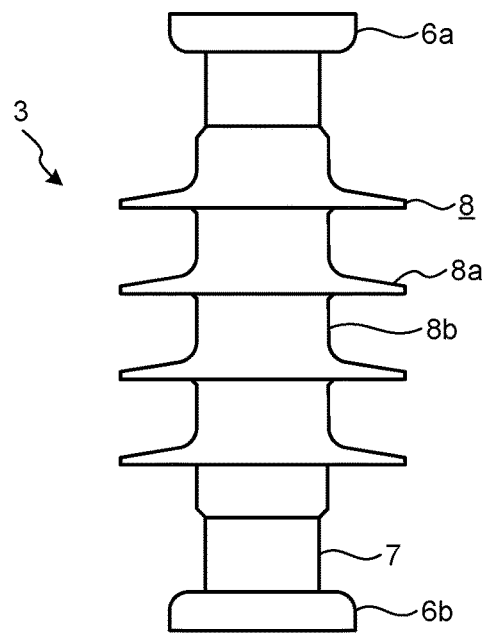
FIG. 3 is a side view illustrating a configuration of an insulating support according to the first embodiment.
Figure 4:
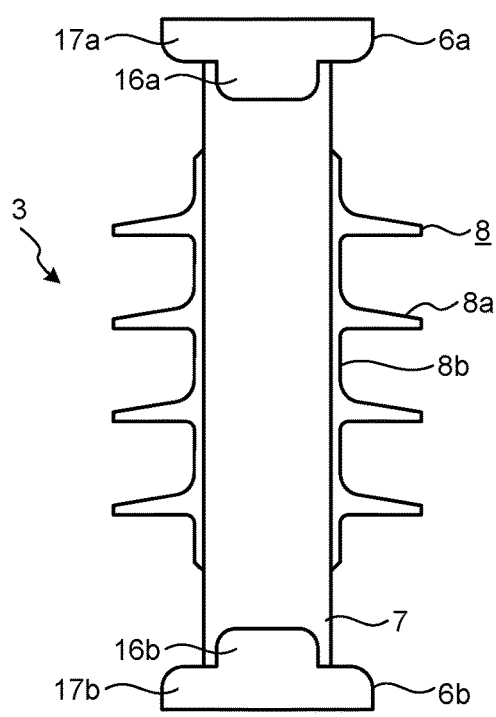
FIG. 4 is a vertical sectional view illustrating the configuration of the insulating support according to the first embodiment.

The configurations of the insulating supports 3, 3a, and 3b are described next. FIG. 3 is a side view illustrating a configuration of an insulating support according to the present embodiment, and FIG. 4 is a vertical sectional view illustrating the configuration of the insulating support according to the present embodiment. While the configuration of the insulating support 3 is described below, each of the insulating supports 3a and 3b has a configuration the same as that of the insulating support 3.

The insulating support 3 includes a core part 7, an exterior covering part 8 attached on the outer peripheral face of the core part 7, and end metal fittings 6a and 6b provided at opposite ends of the core part 7, respectively.

The core part 7 is a cylindrical solid insulating material molded only from a resin material. It is sufficient if the resin material provides enough strength to bear supporting the main body, which is the conduction part, of the power switchgear. The resin material is, for example, epoxy resin. The core part 7 is formed by molding the resin material. The size of the core part 7 depends on the size and weight of the conduction part. For example, the radius and the length of the core part 7 are several tens of centimeters, respectively.

The exterior covering part 8 includes a plurality of pleated parts 8a and a trunk part 8b that connects the pleated parts 8a. The exterior covering part 8 is molded only from a rubber material. The rubber material is, for example, silicone rubber. The pleated parts 8a are provided so as to be apart from one another in the axis direction of the core part 7. The pleated parts 8a are provided over the entire periphery of the core part 7 and protrude outward in a radial direction from the trunk part 8b. The trunk part 8b is molded to be one part with the pleated parts 8a. The trunk part 8b has a cylindrical shape with a substantially fixed thickness. Because the insulating support 3 is placed in atmospheric air, there is a possibility that a leakage current flows on the surface of the insulating support 3 due to soiling, and thus the pleated parts 8a are provided to ensure a creepage distance such that the occurrence of a leakage current is prevented.

After being molded separately from the core part 7, the exterior covering part 8 is adhered to the outer peripheral face of the core part 7. Alternatively, it is possible that the core part 7 is placed in a mold and a rubber material is poured into the mold to provide the exterior covering part 8.

The end metal fitting 6a (first end metal fitting) is provided on the upper end of the core part 7. The end metal fitting 6a includes the following: a buried part 16a (first buried part) that is buried in the core part 7; and a base end part 17a (first base end part) that is provided outside the core part 7 to connect with the buried part 16a and is attached to the main body of the power switchgear.

The buried part 16a projects toward the lower end of the core part 7 and has a rounded surface without a square edge at the lower end side. The base end part 17a is formed as one part with the buried part 16a, and the upper part thereof has, for example, a flat surface. The main body of the power switchgear is mounted on and attached to this surface. The horizontal section of the base end part 17a is larger than that of the buried part 16a. In molding the core part 7, the buried part 16a is attached to the upper end of the core part 7.

The end metal fitting 6b (second end metal fitting) is provided on the lower end of the core part 7. The end metal fitting 6b includes a buried part 16b (second buried part) that is buried in the core part 7 and a base end part 17b (second base end part) that is provided outside the core part 7 to connect with the buried part 16b and is settled on the ground surface 2.

The buried part 16b projects toward the upper end of the core part 7 and has a rounded surface without a square edge at the upper end side. The base end part 17b is formed as one part with the buried part 16b and the lower part thereof has, for example, a flat surface. This surface is provided on the ground surface 2. The horizontal section of the base end part 17b is larger than that of the buried part 16b. When molding the core part 7, the buried part 16b is attached into the lower end of the core part 7.

Operational effects of the insulating supports 3, 3a, and 3b configured as described above are explained here. In the present embodiment, the core part 7 has a cylindrical shape that can be easily produced, and the exterior covering part 8 with the pleated parts 8a is attached on the outer peripheral face of the core part 7. As the core part 7 has a cylindrical shape, the structure of the mold is simple; shrinkage or voids are prevented from being generated during the molding and the necessity for deburring after the molding is reduced; and the core part 7 can be produced easily and inexpensively. Further, the exterior covering part 8 is molded separately from the core part 7 so that the number, shape or the like of the pleated parts 8a can be set independently from the production of the core part 7.

Further, in the conventional insulating support for a power switchgear, a core part and pleated parts are molded as one part and from epoxy resin. This means the structure of a mold needs to be complicated; shrinkage, voids or the likes can be easily generated during molding; and processing such as deburring the pleated parts on the split face of the mold is required after the molding. Consequently, a considerable amount of labor and money is needed to produce the insulating supports. When shrinkage or voids are generated during the molding affects the strength, the produced insulating support may not be used and the yield becomes low. Further, the conventional insulating support is easily damaged during transportation, for example, the pleated parts are easily cracked. In addition, when the number of pleated parts is changed due to a change in the creepage distance, it is necessary to reproduce the entire insulating support.

In contrast, in the present embodiment, the yield is high because the core part 7 has a cylindrical shape that can be easily produced. Even when shrinkage or voids are generated in the exterior covering part 8, there is no effect on the strength of the support. Even when shrinkage or voids are generated in the exterior covering part 8, the shrinkage or voids cause no partial discharge because the exterior covering part 8 is placed in atmospheric air. The exterior covering part 8 is not damaged during transportation due to its softness. Even when the number of pleated parts is changed due to a change in the creepage distance, it is sufficient if only the exterior covering part 8 is reproduced.

Other than a cylindrical shape, the core part 7 may have, for example, a solid truncated cone shape that provides the same effect. Particularly, when the radius of the upper end of the core part 7 differs slightly from that of the lower end, substantially the same effect as with a cylindrical shape is achieved.

In the present embodiment, the core part 7 is formed only from a resin material. Accordingly, insulation deterioration of the core part 7 is less likely to occur when compared to a case where the core part 7 is made of FRP. That is, because the insulating supports 3, 3a, and 3b are used in atmospheric air, these supports are affected by moisture adsorption. However, as the insulating supports 3, 3a and 3b are made completely of resin, insulation deterioration caused by moisture adsorption is less likely to occur when compared to a case where the insulating supports 3, 3a and 3b are made of FRP including reinforcing fiber. Further, as the core part 7 is made of an epoxy resin material, it is possible to maintain a higher strength of the core part 7 when compared to a case where the core part 7 is made of FRP.

In the present embodiment, in order to prevent damage to the insulating supports 3, 3a, and 3b due to bearing the load of the conduction part, the end metal fittings 6a and 6b are provided to each of the insulating supports 3, 3a, and 3b. In contrast, the insulator disclosed in Patent Literature 2 differs from the insulating support for a power switchgear according to the present embodiment by not having such fittings to reinforce its strength.

The buried part 16a has a rounded surface that projecting toward the lower end of the core part 7 and that is without a square edge. This rounded surface can relieve an electric field leaking from a conduction part and ease the stress applied on the upper end of the core part 7. When compared to a case where the buried part 16a has a disc shape, the buried part 16a having a rounded surface has a larger contact area with the core part 7. Accordingly, the adhesion strength to the core part 7 increases. The same is true for the buried part 16b.

In the present embodiment, while it has been described that the buried part 16a and the base end part 17a are formed as one part, it is also possible that the buried part 16a and the base end part 17a are formed separately and are fastened together by a fastening member. Similarly, it is possible that the buried part 16b and the base end part 17b are formed separately and are fastened by a fastening member.

Figure 5:
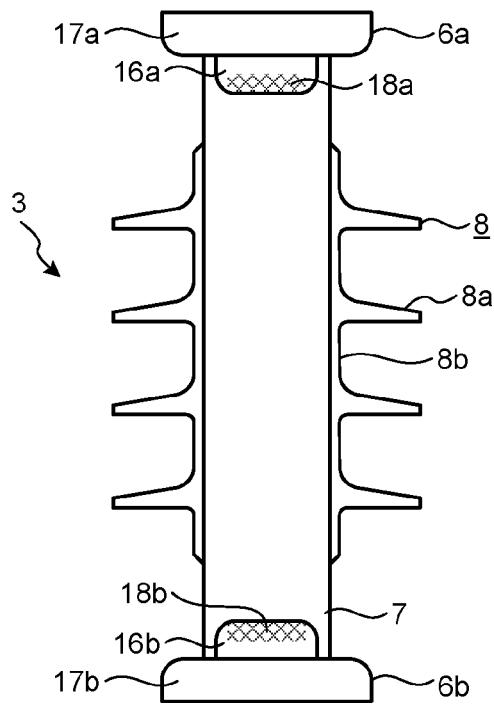
FIG. 5 is a vertical sectional view illustrating a configuration of an insulating support according to a modification of the first embodiment.

FIG. 5 is a vertical sectional view illustrating a configuration of an insulating support according to a modification of the present embodiment. In FIG. 5, the buried part 16a and the base end part 17a are fastened so as to form the end metal fitting 6a, and the buried part 16b and the base end part 17b are fastened so as to form the end metal fitting 6b. The buried parts 16a and 16b are formed separately to the base end parts 17a and 17b, respectively. Accordingly, the base end parts 17a and 17b can be fastened to the buried parts 16a and 16b, respectively, after producing the core part 7 and the buried parts 16a and 16b by molding. In this case, the structure of the mold becomes simpler. With this production method, the core part 7 and the buried parts 16a and 16b, which are integrated after molding, can be extracted in the axis direction without breaking the mold.

Furthermore, in FIG. 5, knurling 18a is provided on the surface of the buried part 16a, and knurling 18b is provided on the surface of the buried part 16b. The knurling 18a is made of a plurality of small grooves provided on the surface of the buried part 16a that makes contact with the core part 7, and the knurling 18a increases the adhesion strength between the buried part 16a and the core part 7. The same is true for the knurling 18b. The knurling 18a and 18b can be also provided in the configuration illustrated in FIG. 4. Other configurations illustrated in FIG. 5 are identical to those of FIG. 4.

As described above, the present embodiment can provide the insulating supports 3, 3a, and 3b, which are produced easily and inexpensively. Due to their excellent insulating properties and mechanical strength, the insulating supports 3, 3a, and 3b can support the conduction part of the power switchgear 1 that has a higher voltage and a larger capacity. Therefore, according to the present embodiment, the power switchgear 1 with a higher voltage and a larger capacity can be obtained.

Second Embodiment

Figure 6:
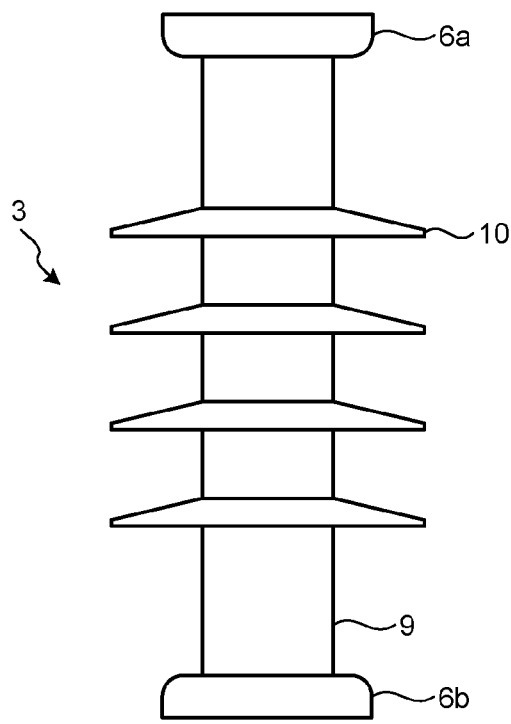
FIG. 6 is a side view illustrating a configuration of an insulating support according to a second embodiment.
Figure 7:
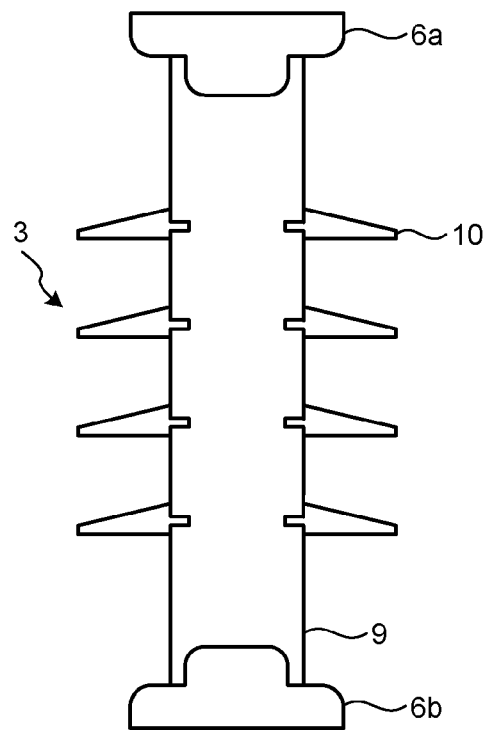
FIG. 7 is a vertical sectional view illustrating the configuration of the insulating support according to the second embodiment.
Figure 8:
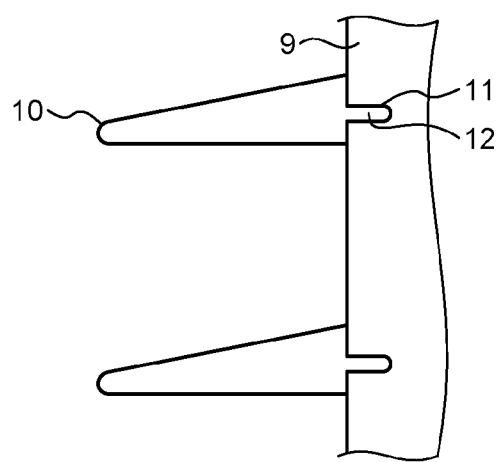
FIG. 8 is an enlarged sectional view illustrating pleated parts according to the second embodiment.

FIG. 6 is a side view illustrating a configuration of an insulating support according to a second embodiment of the present invention; FIG. 7 is a vertical sectional view illustrating the configuration of the insulating support according to the present embodiment; and FIG. 8 is an enlarged sectional view illustrating pleated parts according to the present embodiment. Note that the overall configuration of the power switchgear 1 according to the present embodiment is identical to those illustrated in FIGS. 1 and 2.

As illustrated in FIGS. 6 to 8, the insulating support 3 includes a core part 9; pleated parts 10 functioning as exterior covering parts attached on the outer peripheral face of the core part 9; and the end metal fittings 6a and 6b provided at opposite ends of the core part 9, respectively.

The core part 9 is a solid insulating material having a cylindrical shape or a truncated cone shape molded only from a resin material. It is sufficient if the resin material has enough strength to bear supporting the main body of the power switchgear, and the resin material is epoxy resin, for example.

The pleated parts 10 are provided on the outer peripheral face of the core part 9 so as to be apart from one another in the axis direction of the core part 9. The pleated parts 10 are provided over the entire periphery of the core part 9. However, in contrast to the first embodiment, the pleated parts 10 are separated from one another and the outer peripheral face of the core part 9 is exposed between the pleated parts 10. That is, in the present embodiment, the exterior covering part is constituted only by the pleated parts 10. Each of the pleated parts 10 is molded only from a rubber material. The rubber material is, for example, silicone rubber. Because the insulating support 3 is placed in atmospheric air, a leakage current may flow on the surface of the insulating support 3 due to soiling. Accordingly, the pleated parts 10 are provided to ensure a creepage distance such that the occurrence of a leakage current is prevented.

Each of the pleated parts 10 has a protruding part 12 on the face with which it attaches to the core part 9. For example, protruding parts 12 are provided over the entire periphery of the core part 9. Further, groove parts 11, to which the corresponding protruding parts 12 of the pleated parts 10 are fitted into, are provided on the outer peripheral face of the core part 9. The groove parts 11 function as mounting seats for the corresponding pleated parts 10 and are provided according to the corresponding shapes of the protruding parts 12. The groove parts 11 can be formed by cutting off the outer peripheral face of the core part 9 after molding the core part 9. Alternatively, the groove parts 11 can be formed by molding. After being molded separately from the core part 9, the pleated parts 10 are adhered to the outer peripheral face of the core part 9. At this time, the protruding parts 12 are fitted into the corresponding groove parts 11 provided on the core part 9.

Note that the end metal fittings 6a and 6b are identical to those in the first embodiment.

According to the present embodiment, the protruding parts 12 are provided at the corresponding pleated parts 10; the groove parts 11 are provided on the outer peripheral face of the core part 9; and, when the pleated parts 10 are adhered to the outer peripheral face of the core part 9, the protruding parts 12 are fitted into the corresponding groove parts 11. Accordingly, the pleated parts 10 can be attached easily.

Furthermore, according to the present embodiment, by adjusting the positions where the groove parts 11 are provided, the fixing positions and the number of the pleated parts 10 as well as the spaces between them can be easily adjusted. Particularly, when the groove parts 11 are formed by cutting off the outer peripheral face of the core part 9, it is sufficient if the positions of the groove parts 11, which are notched parts, are adjusted according to the fixing positions and the number of the pleated parts 10 as well as the spaces between them. Alternatively, the fixing positions and the number of the pleated parts 10 as well as the spaces between them can be adjusted by positioning the groove parts 11 in the axis direction at a regular interval, for example, and by selecting the groove parts 11 for actually fixing the corresponding pleated parts 10.

Even when a space is generated between the protruding part 12 and the groove part 11 due to shrinkage or a void in the protruding part 12, the shrinkage or void causes no partial discharge because the pleated parts 10 are placed in atmospheric air.

Other operational effects of the present embodiment are identical to those of the first embodiment.

Third Embodiment

Figure 9:
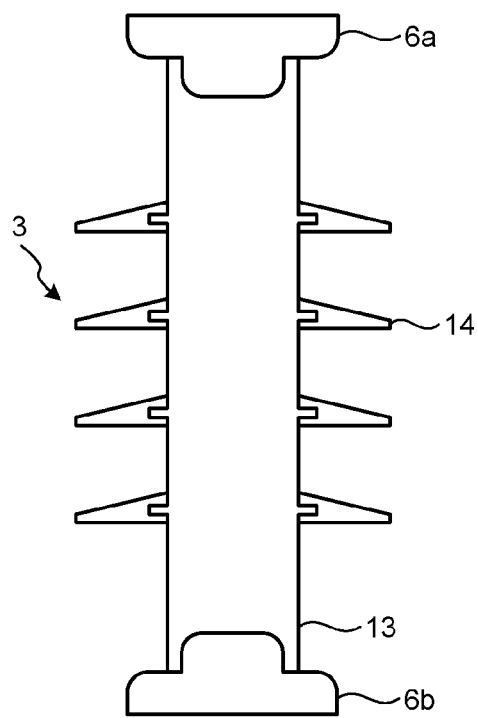
FIG. 9 is a vertical sectional view illustrating a configuration of an insulating support according to a third embodiment.
Figure 10:
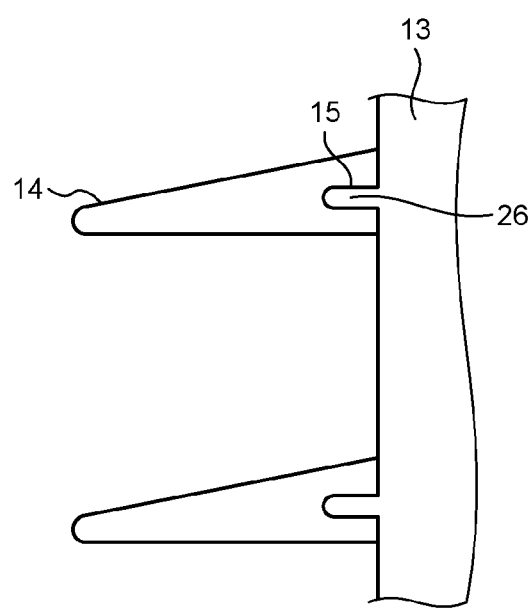
FIG. 10 is an enlarged sectional view illustrating pleated parts according to the third embodiment.

FIG. 9 is a vertical sectional view illustrating a configuration of an insulating support according to a third embodiment of the present invention, and FIG. 10 is an enlarged sectional view illustrating pleated parts according to the present embodiment. Note that the overall configuration of the power switchgear 1 according to the present embodiment is identical to those illustrated in FIGS. 1 and 2.

As illustrated in FIGS. 9 and 10, the insulating support 3 includes a core part 13, pleated parts 14 functioning as exterior covering parts attached on the outer peripheral face of the core part 13, and the end metal fittings 6a and 6b provided at opposite ends of the core part 13, respectively.

The core part 13 is a solid insulating material having a cylindrical shape or a truncated cone shape molded only from a resin material. It is sufficient if the resin material has enough strength to bear supporting the main body, which is a conduction part, of the power switchgear. The resin material is, for example, epoxy resin.

The pleated parts 14 are provided on the outer peripheral face of the core part 13 so as to be apart from one another in the axis direction of the core part 13. The pleated parts 14 are provided over the entire periphery of the core part 13. However, in contrast to the first embodiment, the pleated parts 14 are separated from one another and the outer peripheral face of the core part 13 is exposed between the pleated parts 14. That is, in the present embodiment, the exterior covering part is constituted only by the pleated parts 14. The pleated parts 14 are molded only from a rubber material. The rubber material is, for example, silicone rubber. Because the insulating support 3 is placed in atmospheric air, a leakage current may flow on the surface of the insulating support 3 due to soiling. Accordingly, the pleated parts 14 are provided to ensure there is a creepage distance such that the occurrence of a leakage current is prevented.

Each of the pleated parts 14 has a groove part 15 on the face with which is attaches to the core part 13. For example, the groove parts 15 are provided over the entire periphery of the corresponding pleated parts 14. The groove parts 15 may be notched parts. Alternatively, the groove parts 15 may be formed when the pleated parts 14 are being molded. Protruding parts 26 that are fitted into the corresponding groove parts 15 of the pleated parts 14 are provided on the outer peripheral face of the core part 13. The protruding parts 26 function as mounting seats for the corresponding pleated parts 14 and are provided according to the corresponding shapes of the groove parts 15. After being molded separately from the core part 13, the pleated parts 14 are adhered to the outer peripheral face of the core part 13. At this time, the protruding parts 26 are fitted into the corresponding groove parts 15 provided on the corresponding pleated parts 14.

Note that the end metal fittings 6a and 6b according to the present embodiment are identical to those described in the first embodiment.

According to the present embodiment, the groove parts 15 are provided on the corresponding pleated parts 14; the protruding parts 26 are provided on the outer peripheral face of the core part 13; and, when the pleated parts 14 are adhered to the outer peripheral face of the core part 13, the protruding parts 26 are fitted into the corresponding groove parts 15. Accordingly, the pleated parts 14 can be attached easily.

According to the present embodiment, the fixing positions and the number of the pleated parts 14 as well as the spaces between them can be adjusted by the protruding parts 26 being provided in the axis direction at a regular interval, for example, and by the protruding parts 26 being selected for actually fixing the corresponding pleated parts 14.

Even when the protruding parts 26 have cracks or the like to some extent, these cracks or the like are not a problem for the attachment of the pleated parts 14. Because the protruding part 26 is smaller than the pleated part 14, cracks or the like in the pleated parts 14 do not affect the strength of the core part 13. Even when a space is generated between the protruding part 26 and the groove part 15, the space causes no partial discharge because the pleated parts 14 are provided in atmospheric air.

Other operational effects of the present embodiment are identical to those of the second embodiment.

INDUSTRIAL APPLICABILITY

As described above, the present invention is useful as an insulating support for a power switchgear that is provided between a generator and a main transformer in a power station or the like.

REFERENCE SIGNS LIST 1 power switchgear, 2 ground surface, 3, 3a, 3b insulating support, 6a, 6b end metal fitting, 7, 9, 13 core part, 8 exterior covering part, 8a, 10, 14 pleated part, 8b trunk part, 11, 15 groove part, 12, 26 protruding part, 16a, 16b buried part, 17a, 17b base end part, 18a, 18b knurling, 20 breaker, 21 disconnector, 30a, 30b bus.

The invention claimed is:

1. An insulating support for a power switchgear that insulates and supports a main body of a power switchgear provided in atmospheric air between a generator and a main transformer, the insulating support comprising:
    a solid core part that is molded only from a resin material and has a cylindrical shape or a truncated cone shape;
    an exterior covering part that
    is molded only from a rubber material and separately from the core part,
    is attached to an outer peripheral face of the core part, and
    includes a plurality of pleated parts, the pleated parts being provided so as to be apart from one another in an axis direction of the core part and each of the pleated parts being provided over an entire periphery of the core part;
    a first end metal fitting that includes
    a first buried part buried in one end of the core part and
    a first base end part provided outside the core part, connected to the first buried part, and attached to the main body; and
    a second end metal fitting that includes
    a second buried part buried in another end of the core part and
    a second base end part provided outside the core part, connected to the second buried part, and provided on a ground surface, wherein
    the exterior covering part includes the plurality of pleated parts, the pleated parts being separated from one another,
    the outer peripheral face of the core part between the pleated parts is exposed,
    each of the pleated parts has a protruding part on a face for attaching to the core part, and
    the outer peripheral face of the core part is provided with a groove part thereon into which the protruding part of each of the pleated parts is fitted.

2. The insulating support for a power switchgear according to claim 1, wherein
    the groove part is formed by cutting off the outer peripheral face of the core part.

3. The insulating support for a power switchgear according to claim 1, wherein
    the first buried part and the first base end part are formed as one part, and
    the second buried part and the second base end part are formed as one part.

4. The insulating support for a power switchgear according to claim 1, wherein
    the first buried part and the first base end part are fastened together to be one part, and
    the second buried part and the second base end part are fastened together to be one part.

5. The insulating support for a power switchgear according to claim 1, wherein
    the first buried part has a rounded surface that is projecting toward the other end and that is without a square edge, and
    the second buried part has a rounded surface that is projecting toward the one end and that is without a square edge.

6. The insulating support for a power switchgear according to claim 5, wherein
    the first buried part has knurling on a surface that contacts the core part, and
    the second buried part has knurling on a surface that contacts the core part.

7. The insulating support for a power switchgear according to claim 1, wherein
    the rubber material includes silicone rubber.

8. The insulating support for a power switchgear according to claim 1, wherein
    the resin material includes an epoxy resin material.

9. The insulating support for a power switchgear according to claim 8, wherein
    the first buried part and the first base end part are formed as one part, and
    the second buried part and the second base end part are formed as one part.

10. The insulating support for a power switchgear according to claim 8, wherein
    the first buried part and the first base end part are fastened together to be one part, and
    the second buried part and the second base end part are fastened together to be one part.

11. The insulating support for a power switchgear according to claim 8, wherein
    the first buried part has a rounded surface that is projecting toward the other end and that is without a square edge, and
    the second buried part has a rounded surface that is projecting toward the one end and that is without a square edge.

12. The insulating support for a power switchgear according to claim 11, wherein
    the first buried part has knurling on a surface that contacts the core part, and
    the second buried part has knurling on a surface that contacts the core part.

13. The insulating support for a power switchgear according to claim 8, wherein
    the rubber material includes silicone rubber.

* * * * *